Sept. 6, 1960

F. C. RUSHING 2,951,731

CENTRIFUGES

Filed Sept. 25, 1944

INVENTOR
Frank C. Rushing.
BY
Robert Lavender
ATTORNEY

Sept. 6, 1960

F. C. RUSHING 2,951,731

CENTRIFUGES

Filed Sept. 25, 1944

INVENTOR
Frank C. Rushing.
BY
ATTORNEY

United States Patent Office 2,951,731
Patented Sept. 6, 1960

2,951,731

CENTRIFUGES

Frank C. Rushing, Pittsburgh, Pa., assignor, by mesne assignments, to the United States of America as represented by the United States Atomic Energy Commission Filed Sept. 25, 1944, Ser. No. 555,737

2 Claims. (Cl. 308—146)

The present invention relates to centrifuges and like rotating devices, and more particularly to such devices having damping means for damping vibration forces occuring during the operation thereof.

In centrifuges and like devices in which relatively high speeds of rotation are employed certain speeds of operation are encountered called critical speeds. At such speeds the shaft of the device is distorted or flexed out of the axis of rotation and, while rotating in such distorted positions, causes severe vibrating forces to be transmitted to the bearings and supporting structures in which the shaft operates, with consequent danger in operation, possibility of damage to the structure, and lessening of efficient functioning of the assembly. In centrifuges a critical speed occurs where the speed of rotation of the centrifuge is such that the number of revolutions in a given unit of time is equal to the number of vibrations in the same time unit that correspond to one of the natural modes of vibration of the rotating member and its supporting structure, and the speeds of rotation at which these critical speeds occur depend for the most part upon stiffness of the shaft, and the inertia of the stationary and rotating parts of the device. Vibrations also occur throughout the range of speeds of a centrifuge resulting from lack of exact balance in the rotating parts of the device which causes such parts to seek their natural axis of rotation, and while such vibration is of relatively small amplitude, it may become troublesome and destructive at very high speeds of rotation. A fuller consideration and explanation of the forces attendant upon the high speed rotation of centrifuges and similar devices may be found in United States Patent 2,147,420, issued February 14, 1939, to J. G. Baker et al.

It is an object of the invention to provide a centrifuge or like rotating device having effective vibration damping means.

Another object is the provision of damping means particularly adapted to use with centrifuges and like rotating devices which are designed to rotate at high speeds and in the operation of which one or more critical speeds are encountered.

Another object of the invention is to provide damping means effective to damp both the vibration occurring at critical speeds of rotation of a centrifuge and the smaller amplitude vibration due to rotor unbalance which may be troublesome at high speeds of rotation.

Still another object is the provision of effective damping means on the rotor shaft of a high speed centrifuge in order to promote the safe and efficient operation of the device.

These and other objects and advantages of the invention, and the various features and details of the construction and operation thereof, are hereinafter fully set forth and described, and shown in the accompanying drawings in which.

Figure 1:
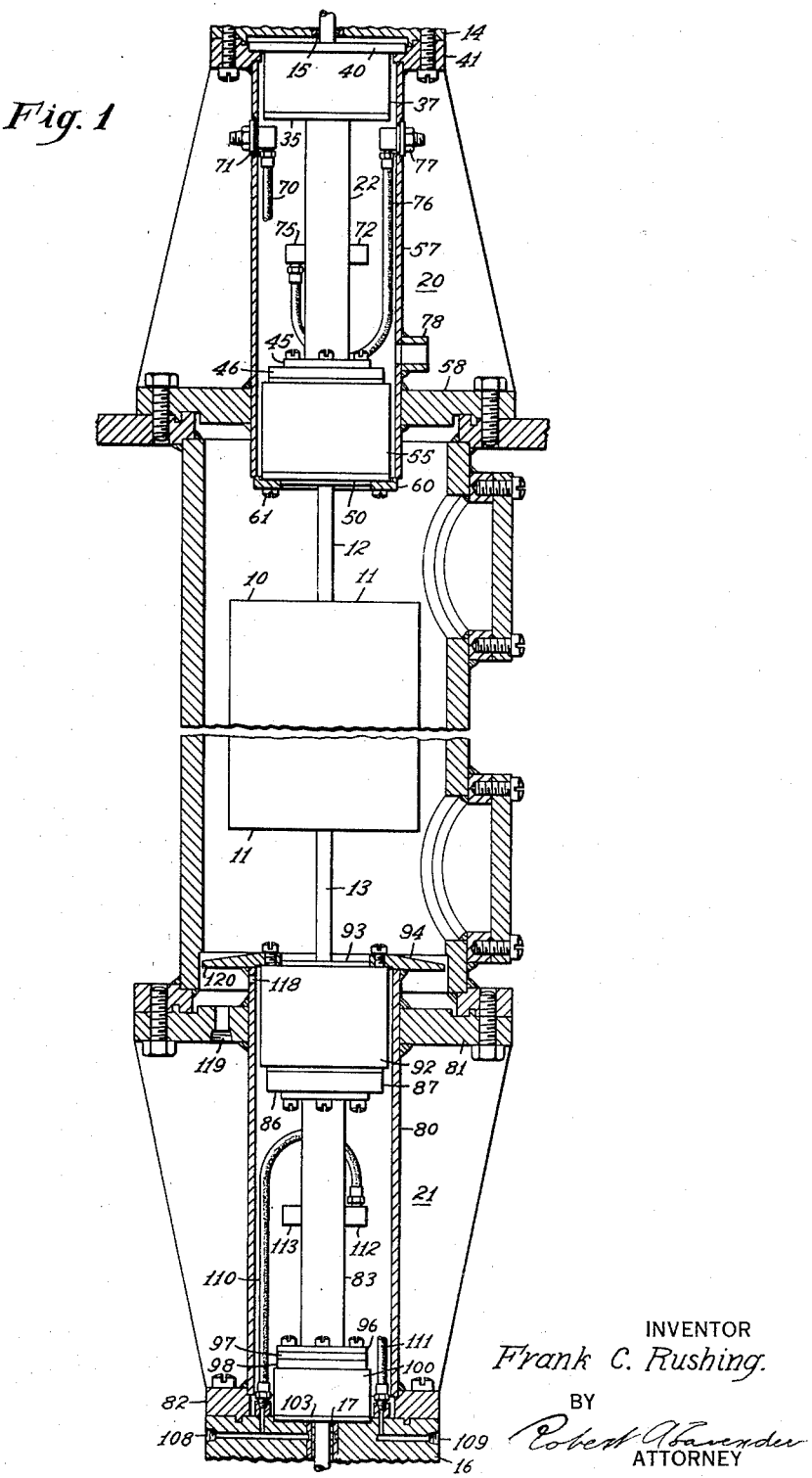
Fig. 1 is a vertical cross sectional view of a centrifuge capable of high speed operation and having vibration damping means in association with the centrifuge shaft.
Figure 2:
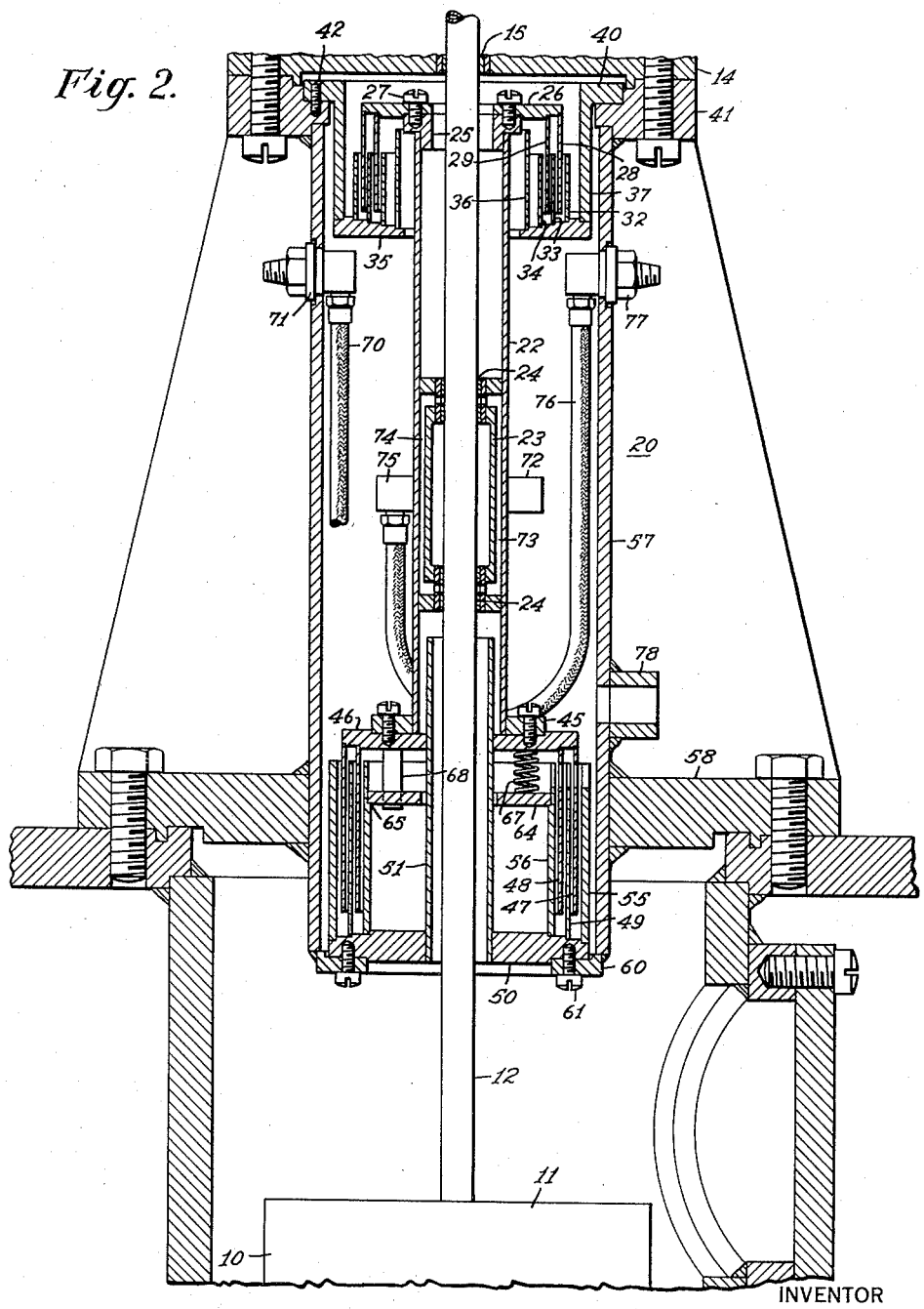
Fig. 2 is a vertical cross sectional view showing in detail the upper damper assembly shown in Fig. 1.
Figure 3:
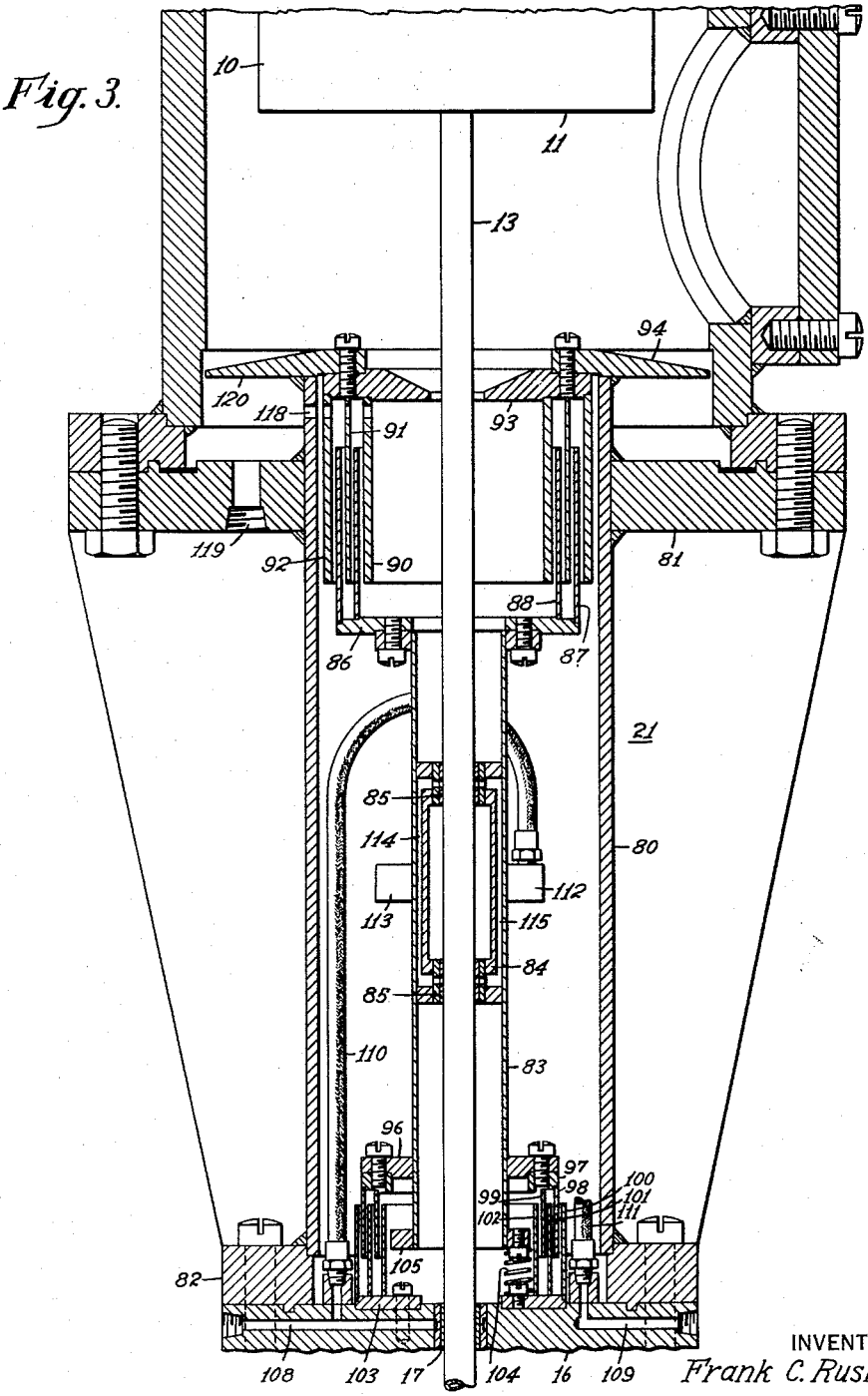
Fig. 3 is a vertical cross sectional view of the lower damper assembly shown in Fig. 1.

In accordance with a typical and illustrative embodiment of the present invention there is provided a centrifuge bowl or rotor in the form of a cylinder mounted for free rotation by means of a shaft at each end, the shafts being suitably journalled in stationary portions of the centrifuge. Damping means for the centrifuge are associated with each shaft between the shaft bearing and rotor end, and each such means comprises two sets of concentric, spaced apart cylindrical sleeves arranged to follow the vibrations of the shaft, which have their sleeves in overlapping relationship with the cylindrical sleeves of other respective sets of concentric, spaced apart sleeves held with respect to a stationary part of the centrifuge, oil or other suitably viscous liquid being retained between the adjacent stationary and movable sleeves. The sets of sleeves to follow the movements of the rotor shaft are mounted at opposite ends of an elongated tubular member surrounding the shaft having a pair of bearings centrally of its length in which the shaft is journalled at about its central portion. The sets of cooperating movable and stationary sleeves nearer the rotor may be of somewhat greater length than the sets nearer the shaft bearing, as their damping effect is somewhat magnified because they are axially offset toward the rotor from the damper bearings for the shaft and maximum damping effect may thus be realized.

The centrifuge of the present invention is capable of speeds of operation as high as 470 revolutions per second, and in such operation undesirable vibration is encountered due both to the existence of critical speeds which must be passed in reaching the high operating speed and to vibrations of relatively small amplitude at other than critical speeds resulting from rotor unbalance and the tendency of the rotor to seek its natural axis of rotation. These latter vibrations are relatively unimportant at slower operating speeds and could be ignored, but at speeds approaching the top speed of the centrifuge they may become dangerous and destructive and it is desirable that their effect be minimized. Vibrations at critical speeds tend to build up to dangerous amplitudes if not neutralized and substantial damage to the centrifuge may result.

The damping means are designed to keep both of these types of vibrations within safe limits. In order to minimize the small amplitude vibrations at high speeds of rotation the mass of the damper mechanism has been made relatively large so that the damper bearing in which the rotor shaft is journalled stabilizes the shaft and minimizes vibrations. The large damper mass also results in damper natural frequencies substantially below the top running frequencies of the centrifuge so that the inertia of the damper is available at the high speeds for minimizing the small amplitude vibrations.

In order to dampen vibrations at critical speeds of the centrifuge the damping mechanism has been so constructed as to have natural frequencies substantially higher than the natural frequencies of the rotor, so that the damper will in no case augment rather than minimize vibrations at critical speeds. This is effected by the relatively stiff tubular member carrying the movable damper sleeves, which causes the damper mechanism to have natural frequencies higher than those of the rotor. At the critical speeds of the centrifuge, therefore, when the rotor is at resonance, the agitation of the damper fluid will dissipate energy and prevent the building up of vibrations to dangerous amplitudes.

As an illustration of these properties of the centrifuge construction of the present invention, a centrifuge adapted to rotation at 470 revolutions per second has been constructed. The natural frequencies of the rotor occur at around 1000 and 2000 revolutions per minute, while the damper natural frequencies are at about 6000 and 10,000 revolutions per minute. It is thus apparent that the damper natural frequencies occur substantially above the rotor natural frequencies and substantially below the top speed of the centrifuge where small amplitude vibrations are troublesome. The damper is therefore effective in protecting the centrifuge both from vibrations at critical speeds and from small amplitude vibrations at the top speeds of operation.

It will be understood that the foregoing general description and the following detailed description as well are exemplary and explanatory of the invention but are not restrictive thereof.

Referring now in detail to the illustrative embodiment of the invention shown by way of example in the accompanying drawings, a centrifuge for high speed rotation may comprise a vertically disposed cylindrical rotor or bowl 10 having ends 11 in which are secured upper and lower hollow shafts 12 and 13 respectively through which material to be centrifuged may pass into and out of the rotor. The upper rotor shaft 12 is journalled for free rotation in portion 14 of the main supporting frame of the centrifuge by means of bearing 15, and the lower shaft 13 is similarly journalled in portion 16 of the main frame by bearing 17. An electric motor or other suitable power source (not shown) may be located at the top of the centrifuge for driving the rotor at the desired high speeds, and a suitable thrust bearing (not shown) may be located at the bottom of shaft 13 for taking the forces of vertical thrust of the rotor and shaft assembly. As embodied in the construction illustrated, damping means are provided for the shafts 12 and 13 in order to dampen the vibrations of the rotor and shaft assembly and to allow for safely passing the critical speeds of the centrifuge. The damper for the upper shaft 12 is indicated generally by the numeral 20, and the damper for the lower shaft 13 by the numeral 21.

The upper damper assembly 20 comprises an elongated tube 22 surrounding shaft 12 and adapted to follow the vibration thereof by means of a bearing holder 23 in which a pair of bearings 24 are provided about shaft 12. At its upper end the tube 22 is provided with an inwardly radially extending shoulder or ring 25 to carry an annular plate 26, a plurality of screws 27 serving to secure plate 26 to ring 25 and tube 22. Depending from the annular plate 26 and secured thereto are a pair of cylindrical baffle elements or sleeves 28 and 29, sleeve 29 being of substantially smaller diameter than sleeve 28 and nested therewithin. Cylindrical sleeves 28 and 29 are thus secured to tube 22 and adapted to follow the vibrations of upper rotor shaft 12. In order to dampen such vibrations sleeves 28 and 29 are associated in nested and spaced part relationship with other cooperating cylindrical baffle elements or sleeves associated with the main frame or other relatively stationary portion of the centrifuge, and a fluid of suitable viscosity, as, for example, oil is retained between the vibrating and stationary sleeves.

As shown, the stationary cylindrical sleeves are members 32, 33 and 34 of diminishing diameter in the order named and alternately nested with respect to vibrating sleeves 28 and 29. Sleeves 32, 33 and 34 are supported by and secured to an annular plate 35 which forms the bottom of an annular chamber for holding fluid about the nested vibrating and stationary sleeves. A fourth stationary cylindrical sleeve 36 of somewhat greater length than sleeves 32, 33 and 34 is secured to plate 35 inwardly of sleeve 34 and serves as the inner wall of the fluid retaining chamber. Plate 35 is secured at its outer edge to a cylindrical member 37 which forms the outer wall of the fluid chamber. Member 37 has an outwardly extending flange 40 by which it is firmly secured to a portion 41 of the main frame of the centrifuge by means of a plurality of screws 42. There is thus provided an annular chamber for holding a body of fluid in which are submerged the stationary sleeves 32, 33 and 34 and the alternately nested sleeves 28 and 29 mounted for vibration with shaft 12. When the damper assembly vibrates the sleeves will agitate the fluid in the chamber and thereby dissipate vibratory energy transmitted from shaft 12 through the tube 22.

A similar arrangement of damping sleeves to be positioned in fluid is provided at the lower end of tube 22. As illustratively shown, this arrangement comprises an outwardly extending annular shoulder 45 secured to tube 22 at its lower edge to which is secured the plate 46. Concentric sleeves 47 and 48 depending from plate 46 are alternately nested with respect to sleeves 49, 55 and 56 extending upwardly from annular plate 50 at the bottom of the damper assembly. The internal wall of the fluid retaining chamber is formed by an elongated cylindrical member 51 secured at its lower edge to plate 50.

The damper assembly 20 for the upper shaft 12 is enclosed within a cylindrical casing 57 which is firmly secured as by welding to the portion 41 of the main frame and another portion 58 of the main frame. An annular flange 60 is welded to the bottom edge of casing 57 and rigidly supports the plate 50, the two members being secured together by means of a plurality of screws 61.

In order to support the tube 22 and its associated elements there is provided an annular ring member 64 seated on a shoulder 65 of the inner stationary sleeve 56. A plurality of coiled springs 67 on the upper surface of ring 64 resiliently support plate 46 and thereby the tube 22. Rotary movement of the plate 46 and tube 22 with respect to the fixed member 64 is prevented by means of stops 68.

Means for supplying a lubricating and cooling fluid to the bearings 24 comprises the flexible hose 70 with connection 71 extending through the outer casing 57 of the damper assembly and communicating with connection 72 on tube 22. Connection 72 has fluid communication through radial ducts in the walls of tube 22 and bearing holder 23 with an axially disposed duct 73 which carries oil to the bearings 24. Oil is similarly conducted from the bearings through suitable ducts communicating with another axially disposed duct 74 in the bearing holder 23, thence through connection 75, flexible hose 76 and outside connection 77.

The cooperating sets of nested sleeves at the upper end of tube 22 are continuously supplied with oil which may pass through the upper bearing 15 and fall downwardly into the chamber defined by sleeves 32 and 36 and oil is continuously furnished to the lower chamber by overflow oil from the upper chamber, and also by lubricating and cooling oil supplied to bearings 24 and flowing axially outwardly from the bearings 24 rather than out through the circulating system. An opening 78 is provided toward the lower end of casing 57 adjacent the upper edge of the sleeve 55 of the lower damper assembly through which excessive oil in the damper may be drained.

The damping means 21 for the lower rotor shaft 13 is similar in construction and operation to damper assembly 20 just described for the upper rotor shaft. As illustratively shown, the lower damping means is enclosed in a casing 80 secured as by welding to the main frame portion 81 adjacent its upper edge and to the annular flange 82 at its lower edge, said flange being supported by and secured to main frame portion 16.

An elongated tube 83 is provided arranged to follow the vibration of shaft 13 by means of bearing holder 84 having bearings 85 in which the shaft is freely rotatable. Tube 83 at its upper end supports the sleeve holder 86 having upwardly extending nested cylindrical elements or sleeves 87 and 88. These sleeves are alternately nested with respect to stationary sleeves 90, 91 and 92 depending from annular sleeve holder 93 which is secured to flange 94 welded to casing 80.

The lower movable sleeve assembly comprises the annular sleeve holder 96 secured to the tube 83 having a collar 97 from which depend concentric cylindrical sleeves 98 and 99. Upwardly extending stationary sleeves 100, 101 and 102 are alternately nested with respect to the movable sleeves 98 and 99 and are supported on a sleeve holder 103 which is in turn supported by and secured to the main frame portion 16. Tube 83 and the elements associated therewith are resiliently supported on sleeve holder 103 by a plurality of coiled springs 104 positioned against a flange 105 at the lower edge of the tube 83.

Means are provided for the circulation of lubricating and cooling oil to and through bearings 85, and as embodied comprise ducts 108 and 109 in the main frame portion 16, flexible hoses 110 and 111 communicating with connections 112 and 113 respectively and through axially arranged ducts 114 and 115 and other suitable ducts to and through bearings 85.

The lower damping mechanism 21 described above is preferably operated submerged in oil which fills the casing 80, and the excess or overflow oil escaping through an aperture 118 adjacent the upper edge of the casing may be drawn off through opening 119 provided in stationary member 81. The flange 94 has an outwardly flared portion 120 which serves as a cover against splash of excess oil escaping through apertures 118 and not yet drawn off through opening 119.

With the construction for a centrifuge shown and described, it will be apparent that damping means have been provided effective to reduce and/or eliminate dangerous and destructive vibration encountered in the shafts 12 and 13 due to unbalance in the rotor 10 or other parts of the rotating system. Double sets of cylindrical sleeves are provided for each rotor shaft 12 and 13, spaced apart along the length of each shaft and adapted to vibrate therewith through the connection of tubes 22 and 83 having plural contacts at bearings 24 and 85 with their respective shafts. Each set of movable cylindrical sleeves is associated in alternately nested relationship with a cooperating set of nested sleeves held stationary by rigid connection with the main frame of the centrifuge, and the cooperating sets of stationary and movable sleeves are each submerged in a body of suitably viscous fluid such as, for instance, oil. Vibratory energy transmitted from shafts 12 and 13 to the movable sleeves is dissipated by agitation of the fluid and excessive vibration of the shafts at critical speeds is effectively prevented, while the substantial damper masses limit vibration at top speeds of rotation as the rotor seeks its natural axis of rotation.

The invention is not limited to the specific mechanism shown and described and numerous variations and modifications may be made therefrom without departing from the scope and spirit of the accompanying claims.

What I claim is:

1. A vibration damping mechanism for a rotatable element having a substantially vertical shaft, said mechanism comprising two sets of nested, spaced cylindrical elements surrounding said shaft, a tubular member surrounding said shaft and secured to said sets adjacent the opposite ends of said member, a pair of spaced bearings centrally of said member in which said shaft is journalled, two other sets of nested, spaced cylindrical elements substantially stationarily held each said other set having its cylindrical elements in alternately nested spaced relationship with respect to the cylindrical elements of a respective one of said first mentioned sets, and means for retaining a fluid about said cylindrical elements.

2. A vibration damping mechanism for a rotatable element having a substantially vertical shaft said mechanism comprising a plurality of sets of nested, spaced cylindrical elements supported for lateral movement with said shaft said sets being spaced apart axially of said shaft, other sets of nested, spaced cylindrical elements substantially stationarily held each such other set cooperating with a respective one of said first mentioned sets, said cooperating sets having their cylindrical elements alternately nested and spaced, means for resiliently supporting said first mentioned sets upon the lowermost of said other sets, and means for retaining fluid about said cylindrical elements.

References Cited in the file of this patent

UNITED STATES PATENTS

| | | |
|---|---|---|
| 826,507 | Holm | July 17, 1906 |
| 913,232 | Pouten | Feb. 23, 1909 |
| 1,554,299 | Seibel | Sept. 22, 1925 |
| 1,713,313 | Miller | Oct. 15, 1929 |
| 1,863,213 | Wintroath | June 14, 1932 |
| 1,876,656 | Forsberg | Sept. 13, 1932 |
| 2,060,835 | Stratford et al. | Nov. 17, 1936 |
| 2,147,420 | Baker et al. | Feb. 14, 1939 |
| 2,219,875 | Roberts et al. | Oct. 29, 1940 |